US012699218B2

(12) United States Patent
    Kuwatani

(10) Patent No.: US 12,699,218 B2
(45) Date of Patent: Aug. 4, 2026

(54) OPTICAL GLASS, OPTICAL ELEMENT BLANK, AND OPTICAL ELEMENT

(71) Applicant: HOYA CORPORATION, Tokyo (JP)

(72) Inventor: Shungo Kuwatani, Tokyo (JP)

(73) Assignee: HOYA CORPORATION, Tokyo (JP)

( * ) Notice: Subject to any disclaimer, the term of this patent is extended or adjusted under 35 U.S.C. 154(b) by 914 days.

(21) Appl. No.: 17/915,271

(22) PCT Filed: Jan. 6, 2021

(86) PCT No.: PCT/JP2021/000161
    § 371 (c)(1),
    (2) Date: Sep. 28, 2022

(87) PCT Pub. No.: WO2021/199554
    PCT Pub. Date: Oct. 7, 2021

(65) Prior Publication Data
    US 2023/0138435 A1      May 4, 2023

(30) Foreign Application Priority Data
    Mar. 31, 2020    (JP) ................................. 2020-061857

(51) Int. Cl.
    *F21V 8/00*      (2006.01)
    *C03C 3/21*      (2006.01)
    *G02B 27/01*     (2006.01)

(52) U.S. Cl.
    CPC ............... *G02B 6/003* (2013.01); *C03C 3/21* (2013.01); *G02B 6/0065* (2013.01); *G02B 27/0172* (2013.01)

(58) Field of Classification Search
    CPC ................................... C03C 3/21; G02B 1/00
    See application file for complete search history.

(56) References Cited

U.S. PATENT DOCUMENTS

| | | | | |
|---|---|---|---|---|
| 2005/0049132 A1* | 3/2005 | Shiraishi | .................. | C03C 4/02 |
| | | | | 501/901 |
| 2015/0368151 A1 | 12/2015 | Kuwatani et al. | | |
| 2020/0095164 A1 | 3/2020 | Shibuya et al. | | |
| 2020/0115271 A1 | 4/2020 | Koide et al. | | |

FOREIGN PATENT DOCUMENTS

| | | | | | |
|---|---|---|---|---|---|
| CN | 101591142 A | 12/2009 | | | |
| CN | 107614449 A | 1/2018 | | | |
| CN | 109231814 A | 1/2019 | | | |
| CN | 109399916 A | 3/2019 | | | |
| CN | 109501809 A | * | 3/2019 | ............. | G02B 6/003 |
| CN | 110650927 A | 1/2020 | | | |
| JP | 2014-159343 A | 9/2014 | | | |
| JP | 2018-002520 A | 1/2018 | | | |
| JP | 2019-001675 A | 1/2019 | | | |
| JP | 2019-034874 A | 3/2019 | | | |
| WO | 2017/006998 A1 | 1/2017 | | | |
| WO | WO-2019221128 A1 | * | 11/2019 | ........... | C03C 23/008 |

OTHER PUBLICATIONS

English Text CN-109501809-A (Year: 2019).*
English text for WO-2019221128-A1 (Year: 2019).*
Office Action issued in JP Patent Application No. 2022-511545, mail date Apr. 23, 2024, translation.
Office Action issued in CN Patent Application No. 202180022711.7, mail date Sep. 30, 2024, translation.
Office Action issued in CN Patent Application No. 202180022711.7, Sep. 9, 2023, translation.
Office Action issued in CN Patent Application No. 202180022711.7, Dec. 17, 2024, translation.
Weimin Li et al., "Rare Earth Glasses", Metallurgical Industry Press, 1st Edition, p. 264, May 31, 2016, translation.
Office Action issued in TW Patent Application No. 110100937, issued Mar. 19, 2024, translation.
Office Action issued in CN Patent Application No. 202180022711.7, mail date Jun. 1, 2024, translation.
ISR issued in International Patent Application No. PCT/JP2021/000161, Mar. 23, 2021, translation.
IPRP issued in International Patent Application No. PCT/JP2021/000161, Sep. 29, 2022, translation.
Office Action issued in JP Patent Application No. 2022-511545, Nov. 21, 2023, translation.

* cited by examiner

*Primary Examiner* — Benjamin L Utech
(74) *Attorney, Agent, or Firm* — GREENBLUM & BERNSTEIN, P.L.C.

(57) ABSTRACT

An optical glass which has a refractive index nd of 1.80 to 2.00 and an Abbe number vd of 17 to 22, contains 25 to 40 mass % of $P_2O_5$, 15 to 40 mass % of $Nb_2O_5$, 10 to 35 mass % of $TiO_2$, 3 to 12 mass % of $B_2O_3$, 0 to 15 mass % of BaO, greater than 0 mass % and 10 mass % or less of $Li_2O$, greater than 0 mass % and 15 mass % or less of a total of $Li_2O$, $Na_2O$, $K_2O$, and $Cs_2O$ [$Li_2O+Na_2O+K_2O+Cs_2O$], has a mass ratio [$TiO_2/(Nb_2O_5+TiO_2+WO_3+Bi_2O_3+Ta_2O_5)$] of $TiO_2$ to the total of $Nb_2O_5$, $TiO_2$, $WO_3$, $Bi_2O_3$, and $Ta_2O_5$ of 0.33 to 0.60, and does not substantially contain F.

20 Claims, 3 Drawing Sheets

[FIG. 1]
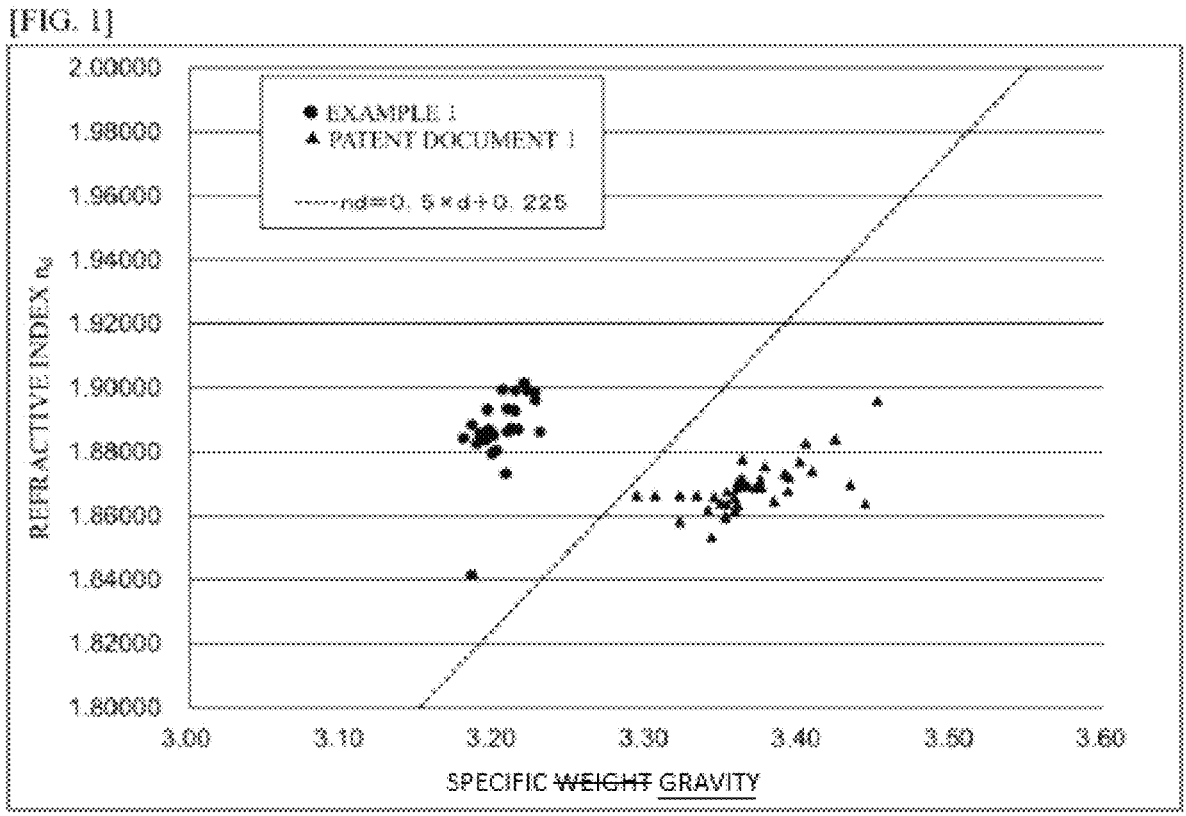

[FIG. 2]
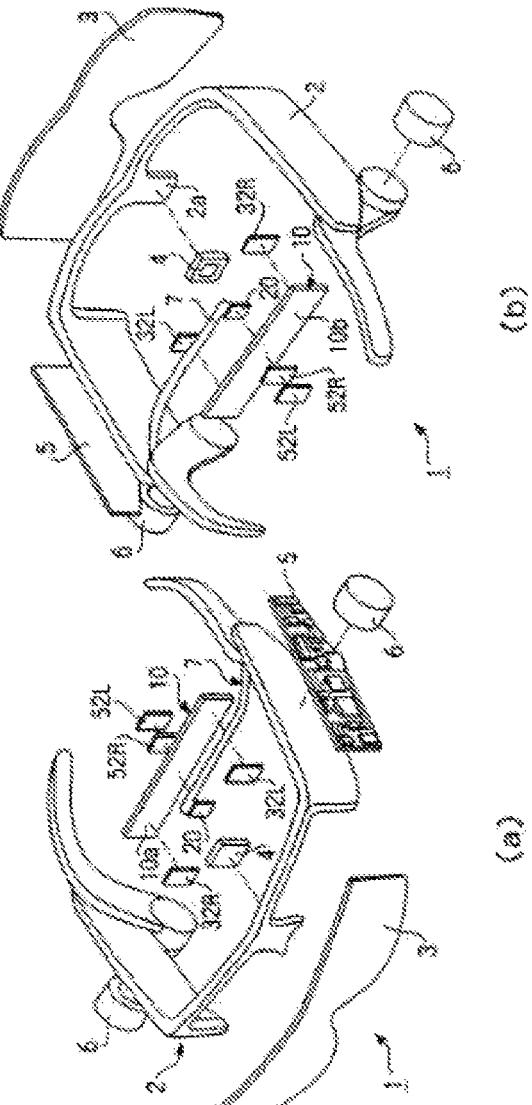

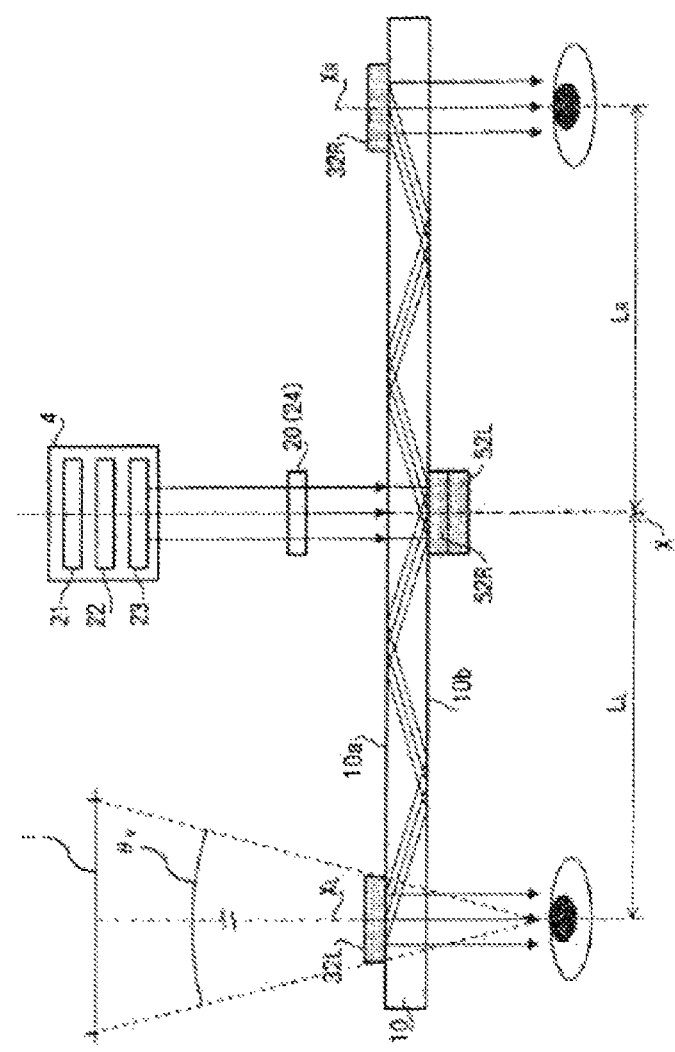
[FIG. 3]

OPTICAL GLASS, OPTICAL ELEMENT BLANK, AND OPTICAL ELEMENT

TECHNICAL FIELD

The present invention relates to optical glass, an optical element blank, and an optical element.

BACKGROUND ART

Recently, as an augmented reality (AR) device, for example, a goggle type or spectacle type display device has been developed with the progress of an augmented reality (AR) technology. For example, in the goggle type display device, a lens having a high refractive index and a low specific gravity is required, and there is a high demand for glass that can be applied to such a lens.

In Patent Document 1, optical glass having a high refractive index is disclosed. However, the optical glass has a problem that a specific gravity is excessively large with respect to a refractive index to be adopted as a lens for an AR device.

Therefore, optical glass of which a specific gravity is reduced while maintaining a high refractive index is required.

Patent Document 1: JP Patent Application Laid Open No. 2018-2520

SUMMARY

The present invention has been made in consideration of such circumstances, and an object thereof is to provide optical glass having a high refractive index and a comparatively low weight, and an optical element.

The gist of the present invention is as follows.

[1] Optical glass,
in which a refractive index nd is 1.80 to 2.00,
an Abbe's number vd is 17 to 22,
a content of $P_2O_5$ is 25 to 40% by mass,
a content of $Nb_2O_5$ is 15 to 40% by mass,
a content of $TiO_2$ is 10 to 35% by mass,
a content of $B_2O_3$ is 3 to 12% by mass,
a content of BaO is 0 to 15% by mass,
a content of $Li_2O$ is greater than 0% by mass and 10% by mass or less,
a total content $[Li_2O+Na_2O+K_2O+Cs_2O]$ of $Li_2O$, $Na_2O$, $K_2O$, and $Cs_2O$ is greater than 0% by mass and 15% by mass or less,
a mass ratio $[TiO_2/(Nb_2O_5+TiO_2+WO_3+Bi_2O_3+Ta_2O_5)]$ of the content of $TiO_2$ to a total content of $Nb_2O_5$, $TiO_2$, $WO_3$, $Bi_2O_3$, and $Ta_2O_5$ is 0.33 to 0.60, and
F is not substantially contained.
[2] Phosphate optical glass containing $Nb_2O_5$ and $TiO_2$,
in which a refractive index nd and a specific gravity d satisfy Expression (1) described below.

$$nd \geq 0.5 \times d + 0.225 \qquad (1)$$

[3] An optical element blank, including the optical glass according to [1] or [2].
[4] An optical element, including the optical glass according to [1] or [2].
[5] A light guide plate, including the optical glass according to [1] or [2].
[6] An image display device, including:
an image display element; and
a light guide plate guiding light exiting from the image display element, in which the light guide plate includes the optical glass according to [1] or [2].

According to the present invention, optical glass having a high refractive index and a comparatively low weight, and an optical element can be provided.

BRIEF DESCRIPTION OF DRAWINGS

FIG. 1 is a graph in which an example of optical glass according to the embodiment of the present invention and optical glass disclosed in Examples of Patent Document 1 are plotted with a refractive index nd as a vertical axis and a specific gravity as a horizontal axis;

FIG. 2 is a diagram illustrating a configuration of a head mounted display using a light guide plate that is one aspect of the present invention; and FIG. 3 is a side view schematically illustrating the configuration of the head mounted display using the light guide plate that is one aspect of the present invention.

In the present invention and the present specification, a glass composition is represented in terms of an oxide, unless otherwise specified. Here, the "glass composition in terms of an oxide" indicates a glass composition to be obtained by converting all glass raw materials as an oxide in glass that is obtained by decomposing all the glass raw materials in melting. The total content of all the glass components (excluding Sb ($Sb_2O_3$) and Ce ($CeO_2$) to be added as a clarificant) represented in terms of an oxide is 100% by mass. Each of the glass components is noted as $SiO_2$, $TiO_2$, and the like, in accord with the custom. Unless otherwise specified, the content and the total content of the glass components are on a mass basis, and "%" indicates "% by mass".

The content of the glass component can be quantified by a known method, for example, a method such as an inductively coupled plasma atomic emission spectrometry (ICP-AES) and an inductively coupled plasma mass spectrometry (ICP-MS). In addition, in the present specification and the present invention, the content of a structural component of 0% indicates that the structural component is not substantially contained, and the component is allowed to be contained at an inevitable impurity level.

In the present specification, unless otherwise specified, the refractive index indicates a refractive index nd at a d line (a wavelength of 587.56 nm) of helium.

In addition, an Abbe's number vd is used as a value indicating properties relevant to dispersion, and is represented by the following expression. Here, nF is a refractive index at an F line (a wavelength of 486.13 nm) of blue hydrogen, and nC is a refractive index at a C line (656.27 nm) of red hydrogen.

$$vd=(nd-1)/(nF-nC)$$

Hereinafter, optical glass of the present invention will be described separately in a first embodiment and a second embodiment. Note that, the function and the effect of each glass component in the second embodiment are identical to the function and the effect of each glass component in the first embodiment. Therefore, in the second embodiment, the description overlapping with the description of the first embodiment will be suitably omitted.

First Embodiment

Optical glass according to a first embodiment,
in which a refractive index nd is 1.80 to 2.00,
an Abbe's number vd is 17 to 22, a content of $P_2O_5$ is 25 to 40%,
a content of $Nb_2O_5$ is 15 to 40%,
a content of $TiO_2$ is 10 to 35%,
a content of $B_2O_3$ is 3 to 12%,
a content of BaO is 0 to 15%,
a content of $Li_2O$ is greater than 0% and 10% or less,
a total content $[Li_2O+Na_2O+K_2O+Cs_2O]$ of $Li_2O$, $Na_2O$,
    $K_2O$, and $Cs_2O$ is greater than 0% and 15% or less,
a mass ratio $[TiO_2/(Nb_2O_5+TiO_2+WO_3+Bi_2O_3+Ta_2O_5)]$
    of the content of $TiO_2$ to a total content of $Nb_2O_5$, $TiO_2$,
    $WO_3$, $Bi_2O_3$, and $Ta_2O_5$ is 0.33 to 0.60, and
F is not substantially contained.

In the optical glass according to first embodiment, the refractive index nd is 1.80 to 2.00. A lower limit of refractive index nd is preferably 1.810, and may be 1.820, 1.830, or 1.840. In addition, an upper limit of the refractive index nd is preferably 1.950, and may be 1.920, 1.910, 1.900, or 1.890.

In the optical glass according to the first embodiment, the Abbe's number vd is 17 to 22. A lower limit of the Abbe's number vd is preferably 18, and may be 18.5. In addition, an upper limit of the Abbe's number vd is preferably 21, and may be 20.5.

In the optical glass according to the first embodiment, the content of $P_2O_5$ is 25 to 40%. A lower limit of the content of $P_2O_5$ is preferably 27%, and more preferably 28%, 29%, 30%, and 31% in this order. In addition, an upper limit of the content of $P_2O_5$ is preferably 39%, and more preferably 38%, 37%, 36%, and 35% in this order.

$P_2O_5$ is a network-forming component, and is an essential component for containing a large amount of highly dispersive components in the glass. By setting the content of $P_2O_5$ to be in the range described above, thermal stability can be improved.

In the optical glass according to the first embodiment, the content of $Nb_2O_5$ is 15 to 40%. A lower limit of the content of $Nb_2O_5$ is preferably 20%, and more preferably 22%, 24%, 25%, 26%, 27%, and 28% in this order. In addition, an upper limit of the content of $Nb_2O_5$ is preferably 39%, and more preferably 38%, 37%, 36%, and 35% in this order.

$Nb_2O_5$ is a component that contributes to an increase in the refractive index and high dispersion. In addition, by setting the content of $Nb_2O_5$ to be in the range described above, the thermal stability and chemical durability of the glass can be improved. On the other hand, in a case where the content of $Nb_2O_5$ excessively increases, there is a tendency that the thermal stability of the glass decreases, and the coloration of the glass is thickened. In addition, the specific gravity of the glass may increase.

In the optical glass according to the first embodiment, the content of $TiO_2$ is 10 to 35%. A lower limit of the content of $TiO_2$ is preferably 12%, and more preferably 14%, 15%, 16%, 17%, and 18% in this order. In addition, an upper limit of the content of $TiO_2$ is preferably 34%, and more preferably 32%, 31%, 30%, 29%, and 28% in this order.

$TiO_2$ greatly contributes to an increase in the refractive index and high dispersion. In addition, $TiO_2$ contributes to a decrease in the specific gravity among high-refractive index components. By setting the content of $TiO_2$ to be in the range described above, a high refractive index and a low specific gravity can be compatible. On the other hand, in a case where the content of $TiO_2$ is excessively high, there is a tendency that in a process where molten glass is molded and gradually cooled to obtain optical glass, crystal growth in the glass is accelerated, and the transparency of the glass decreases (the glass is clouded). In addition, the coloration may increase.

In the optical glass according to the first embodiment, the content of $B_2O_3$ is 3 to 12%. A lower limit of the content of $B_2O_3$ is preferably 3.00%, and more preferably 3.50%, 4.00%, and 4.50% in this order. In addition, an upper limit of the content of $B_2O_3$ is preferably 10.0%, and more preferably 9.0%, 8.0%, and 7.5% in this order.

$B_2O_3$ is a network-forming component of the glass. In addition, $B_2O_3$ contributes to an increase in the refractive index among the network-forming components of the glass. By setting the content of $B_2O_3$ to be in the range described above, the thermal stability of the glass can be improved. On the other hand, in a case where the content of $B_2O_3$ is excessively high, there is a tendency that high dispersion is hindered, and devitrification resistance decreases.

In the optical glass according to the first embodiment, the content of BaO is 0 to 15%. An upper limit of the content of BaO is preferably 5%, and more preferably 3% and 1% in this order. In addition, the content of BaO may be 0%.

By setting the content of BaO to be in the range described above, the thermal stability and the devitrification resistance of the glass can be improved. On the other hand, in a case where the content of BaO is excessively high, high dispersivity may be impaired, and the thermal stability and the devitrification resistance of the glass may decrease. In addition, the specific gravity of the glass may increase.

In the optical glass according to the first embodiment, the content of $Li_2O$ is greater than 0% and 10% or less. An upper limit of the content of $Li_2O$ is preferably 8.00%, and more preferably 6.00%, 5.00%, and 4.00% in this order. In addition, a lower limit of the content of $Li_2O$ is preferably 0.20%, and more preferably 0.30%, 0.40%, 0.50%, and 0.60% in this order.

By setting the content of $Li_2O$ to be in the range described above, the thermal stability of the glass can be improved. In addition, $Li_2O$ contributes to an increase in the refractive index among alkali components. On the other hand, in a case where the content of $Li_2O$ is excessively high, the thermal stability, the chemical durability, and the weather resistance may decrease.

In the optical glass according to the first embodiment, the total content $[Li_2O+Na_2O+K_2O+Cs_2O]$ of $Li_2O$, $Na_2O$, $K_2O$, and $Cs_2O$ is greater than 0% and 15% or less. A lower limit of the total content is preferably 0.5%, and more preferably 2.0%, 3.0%, and 3.5% in this order. In addition, an upper limit of the total content is preferably 14.5%, and more preferably 140.0% and 13.7% in this order.

By setting the total content $[Li_2O+Na_2O+K_2O+Cs_2O]$ to be in the range described above, the thermal stability can be improved. On the other hand, in a case where the total content is excessively high, the chemical durability and the weather resistance may decrease. In addition, the refractive index may decrease.

In the optical glass according to the first embodiment, the mass ratio $[TiO_2/(Nb_2O_5+TiO_2+WO_3+Bi_2O_3+Ta_2O_5)]$ of the content of $TiO_2$ to the total content of $Nb_2O_5$, $TiO_2$, $WO_3$, $Bi_2O_3$, and $Ta_2O_5$ is 0.33 to 0.60. A lower limit of the mass ratio is preferably 0.34, and more preferably 0.35, 0.36, and 0.37 in this order. In addition, an upper limit of the mass ratio is preferably 0.58, and more preferably 0.55, 0.52, 0.51, 0.50, and 0.49 in this order.

All of $Nb_2O_5$, $TiO_2$, $WO_3$, $Bi_2O_3$, and $Ta_2O_5$ are a glass component that contributes to an increase in the refractive index and high dispersion, but also cause an increase in the specific gravity. $TiO_2$ contributes to an increase in the refractive index, compared to $Nb_2O_5$, $WO_3$, $Bi_2O_3$, and $Ta_2O_5$, but is less likely to increase the specific gravity of the glass. Therefore, in the embodiment of the present invention, by setting a content ratio of $TiO_2$ in $Nb_2O_5$, $TiO_2$, $WO_3$, $Bi_2O_3$, and $Ta_2O_5$ to be in the range described above, optical glass having a high refractive index and a low specific gravity can be obtained.

The optical glass according to the first embodiment does not substantially contain fluorine (F). That is, in the optical glass according to the first embodiment, an anionic component is mainly oxygen (O). In a case where the content of F is represented by % by mass with respect to the total amount of glass substances in terms of an oxide, the content of F is preferably less than 1%, and more preferably 0.5% or less, 0.2% or less, and 0.1% or less in this order, by an external ratio.

Here, the "external ratio" of F component indicates the amount of substance of F component that is represented by % by mass when it is assumed that all cationic components configuring the glass form oxides bonded to oxygen commensurate with a charge, and the total amount of substances configuring the glass which are composed of the oxides is set to 100%.

Non-restrictive examples of the content, the ratio, and the properties of glass components other than the above in the optical glass according to the first embodiment will be described.

In the optical glass according to the first embodiment, an upper limit of the content of $SiO_2$ is preferably 3%, and more preferably 2% and 1.5% in this order. The content of $SiO_2$ may be 0%.

$SiO_2$ is a network-forming component of the glass, and has a function of improving the thermal stability, the chemical durability, and the weather resistance of the glass, of increasing the viscosity of the molten glass, and of easily molding the molten glass. On the other hand, in a case where the content of $SiO_2$ is high, the devitrification resistance of the glass tends to decrease. Accordingly, it is preferable that the upper limit of the content of $SiO_2$ is in the range described above, from the viewpoint of improving the thermal stability, the devitrification resistance, and the like of the glass.

In the optical glass according to the first embodiment, an upper limit of the content of $Al_2O_3$ is preferably 3%, and more preferably 2% and 1% in this order. The content of $Al_2O_3$ may be 0%.

$Al_2O_3$ is a glass component having a function of improving the chemical durability and the weather resistance of the glass, and can be considered as a network-forming component. On the other hand, in a case where the content of $Al_2O_3$ increases, the devitrification resistance of the glass may decrease. In addition, a problem such as an increase in a glass transition temperature Tg and a decrease in the thermal stability easily occurs. From the viewpoint of avoiding the above problem, it is preferable that the upper limit of the content of $Al_2O_3$ is in the range described above.

In the optical glass according to the first embodiment, a lower limit of the total content $[P_2O_5+B_2O_3+SiO_2+Al_2O_3]$ of $P_2O_5$, $B_2O_3$, $SiO_2$, and $Al_2O_3$ is preferably 28%, and more preferably 30%, 32%, 33%, 34%, 35%, and 35.5% in this order. In addition, an upper limit of the total content is preferably 45%, and more preferably 43%, 42%, 41%, and 40% in this order.

$P_2O_5$, $B_2O_3$, $SiO_2$, and $Al_2O_3$ are known as a network-forming component of the glass. The network-forming component of the glass improves the devitrification resistance. In addition, the network-forming component of the glass has a function of suppressing an excessive decrease in the viscosity of the molten glass and of easily molding the molten glass. Therefore, in order to obtain optical glass excellent in moldability and the devitrification resistance, it is preferable that the total content $[P_2O_5+B_2O_3+SiO_2+Al_2O_3]$ is in the range described above.

In the optical glass according to the first embodiment, a lower limit of the content of $WO_3$ is preferably 0%. In addition, an upper limit of the content of $WO_3$ is preferably 5%, and more preferably 3% and 1% in this order. The content of $WO_3$ may be 0%.

$WO_3$ easily causes the coloration of the glass, and may degrade a transmittance. In addition, $WO_3$ may cause a high specific gravity. Therefore, it is preferable that the content of $WO_3$ is in the range described above.

In the first embodiment, an upper limit of the content of $Bi_2O_3$ is preferably 5%, and more preferably 3% and 2% in this order. In addition, a lower limit of the content of $Bi_2O_3$ is preferably 0%. The content of $Bi_2O_3$ may be 0%.

$Bi_2O_3$ has a function of improving the thermal stability of the glass at a suitable content. On the other hand, in a case where the content of $Bi_2O_3$ increases, the coloration of the glass may increase. In addition, $Bi_2O_3$ may cause a high weight. Therefore, it is preferable that the content of $Bi_2O_3$ is in the range described above.

In the optical glass according to the first embodiment, a lower limit of the total content $[TiO_2+Nb_2O_5+WO_3+Bi_2O_3]$ of $TiO_2$, $Nb_2O_5$, $WO_3$, and $Bi_2O_3$ is preferably 40%, and more preferably 42%, 44%, 46%, 47%, 48%, 49%, and 50% in this order. In addition, an upper limit of the total content is preferably 65%, and more preferably 63%, 61%, 59%, 58%, and 57% in this order.

$TiO_2$, $Nb_2O_5$, $WO_3$, and $Bi_2O_3$ contribute to an increase in the refractive index and high dispersion of the glass, and also have a function of improving the thermal stability of the glass at a suitable content. On the other hand, $TiO_2$, $Nb_2O_5$, $WO_3$, and $Bi_2O_3$ are also a component for increasing the coloration of the glass. Therefore, it is preferable that the total content $[TiO_2+Nb_2O_5+WO_3+Bi_2O_3]$ is in the range described above.

In the optical glass according to the first embodiment, a lower limit of a mass ratio $[(P_2O_5+B_2O_3+SiO_2+Al_2O_3)/(TiO_2+Nb_2O_5+WO_3+Bi_2O_3)]$ of the total content of $P_2O_5$, $B_2O_3$, $SiO_2$, and $Al_2O_3$ to the total content of $TiO_2$, $Nb_2O_5$, $WO_3$, and $Bi_2O_3$ is preferably 0.50, and more preferably 0.52, 0.54, 0.56, 0.58, 0.60, 0.62, 0.64, and 0.65 in this order. In addition, an upper limit of the mass ratio is preferably 0.85, and more preferably 0.83, 0.81, 0.79, 0.77, and 0.76 in this order.

All of $TiO_2$, $Nb_2O_5$, $WO_3$, and $Bi_2O_3$ are a glass component that contributes to high dispersion. Therefore, it is preferable that the content ratio of such components and the network-forming components is in the range described above.

In the optical glass according to the first embodiment, an upper limit of the content of $Na_2O$ is preferably 5.0%, and more preferably 4.5% and 4.0% in this order. In addition, a lower limit of the content of $Na_2O$ is preferably 0%. The content of $Na_2O$ may be 0%.

In the optical glass according to the first embodiment, an upper limit of the content of $K_2O$ is preferably 12%, and more preferably 11%, 10%, 9%, and 8% in this order. In addition, a lower limit of the content of $K_2O$ is preferably 0%, and more preferably 1.0%, 2.0%, and 2.5% in this order.

$Na_2O$ and $K_2O$ have a function of improving the thermal stability of the glass, but in a case where the contents of $Na_2O$ and $K_2O$ increase, the thermal stability, the chemical durability, and the weather resistance may decrease. Accordingly, it is preferable that the contents of $Na_2O$ and $K_2O$ are in the ranges described above, respectively.

In the optical glass according to the first embodiment, an upper limit of the content of $Cs_2O$ is preferably 2%. In addition, a lower limit of the content of $Cs_2O$ is preferably 0%.

$Cs_2O$ has a function of improving the thermal stability of the glass, but in a case where the content of $Cs_2O$ increases, the thermal stability, the chemical durability, and the weather resistance of the glass may decrease. Accordingly, it is preferable that the content of $Cs_2O$ is in the range described above.

In the optical glass according to the first embodiment, an upper limit of the content of MgO is preferably 10%, and more preferably 5%, 4%, 3%, 2%, and 1% in this order. In addition, the content of MgO may be 0%.

In the optical glass according to the first embodiment, an upper limit of the content of CaO is preferably 5%, and more preferably 4%, 3%, 2%, and 1% in this order. In addition, the content of CaO may be 0%.

In the optical glass according to the first embodiment, an upper limit of the content of SrO is preferably 5%, and more preferably 3% and 1% in this order. In addition, a lower limit of the content of SrO is preferably 0%.

All of MgO, CaO, SrO, and BaO are a glass component having a function of improving the thermal stability and the devitrification resistance of the glass. However, in a case where the contents of such glass components increase, the thermal stability and the devitrification resistance of the glass may decrease. Accordingly, it is preferable that the contents of the glass components are in the ranges described above, respectively.

In the optical glass according to the first embodiment, an upper limit of the total content [MgO+CaO+SrO+BaO] of MgO, CaO, SrO, and BaO is preferably 10%, and more preferably 5%, 4%, 3%, 2%, and 1% in this order. In addition, a lower limit of the total content is preferably 0%. From the viewpoint of maintaining the thermal stability and the devitrification resistance, it is preferable that the total content [MgO+CaO+SrO+BaO] is in the range described above.

In the optical glass according to the first embodiment, an upper limit of the content of ZnO is preferably 5%, and more preferably 3% and 1% in this order. In addition, a lower limit of the content of ZnO is preferably 0%.

ZnO is a glass component having a function of improving the thermal stability of the glass. However, in a case where the content of ZnO is excessively high, high dispersivity of the glass is impaired. Accordingly, from the viewpoint of improving the thermal stability of the glass and of maintaining desired optical properties, it is preferable that the content of ZnO is in the range described above.

In the optical glass according to the first embodiment, an upper limit of the content of $ZrO_2$ is preferably 5%, and more preferably 3% and 1% in this order. In addition, a lower limit of the content of $ZrO_2$ is preferably 0%.

$ZrO_2$ is a glass component having a function of improving the thermal stability and the devitrification resistance of the glass. However, in a case where the content of $ZrO_2$ is excessively high, the thermal stability tends to decrease. Accordingly, from the viewpoint of excellently maintaining the thermal stability and the devitrification resistance of the glass, it is preferable that the content of $ZrO_2$ is in the range described above.

In the optical glass according to the first embodiment, an upper limit of the content of $Ta_2O_5$ is preferably 5%, and more preferably 3% and 2% in this order. In addition, a lower limit of the content of $Ta_2O_5$ is preferably 0%.

$Ta_2O_5$ is a glass component having a function of improving the thermal stability and the devitrification resistance of the glass. On the other hand, $Ta_2O_5$ increases the refractive index, and causes low dispersion of the glass. In addition, in a case where the content of $Ta_2O_5$ increases, the thermal stability of the glass may decrease, and when melting the glass, the unmelted residue of the glass raw material is likely to be generated. Accordingly, it is preferable that the content of $Ta_2O_5$ is in the range described above. Further, $Ta_2O_5$ is an extremely expensive component, compared to the other glass components, and in a case where the content of $Ta_2O_5$ increases, a production cost of the glass may increase. Further, $Ta_2O_5$ has a high molecular weight, compared to the other glass components, and thus, may increase the specific gravity of the glass, and as a result thereof, may increase the weight of the optical element.

In the optical glass according to the first embodiment, an upper limit of the content of $Sc_2O_3$ is preferably 2%. In addition, a lower limit of the content of $Sc_2O_3$ is preferably 0%.

In the optical glass according to the first embodiment, an upper limit of the content of $HfO_2$ is preferably 2%. In addition, a lower limit of the content of $HfO_2$ is preferably 0%.

Both of $Sc_2O_3$ and $HfO_2$ have a function of increasing the refractive index nd, and are an expensive component. Accordingly, it is preferable that the contents of $Sc_2O_3$ and $HfO_2$ are in the range described above, respectively.

In the optical glass according to the first embodiment, an upper limit of the content of $Lu_2O_3$ is preferably 2%. In addition, a lower limit of the content of $Lu_2O_3$ is preferably 0%.

$Lu_2O_3$ has a function of increasing the refractive index nd. In addition, $Lu_2O_3$ has a high molecular weight, and thus, is also a glass component for increasing the specific gravity of the glass. Accordingly, it is preferable that the content of $Lu_2O_3$ is in the range described above.

In the optical glass according to the first embodiment, an upper limit of the content of $GeO_2$ is preferably 2%. In addition, a lower limit of the content of $GeO_2$ is preferably 0%.

$GeO_2$ has a function of increasing the refractive index nd, and is a prominently expensive component among the glass components that are generally used. Therefore, from the viewpoint of reducing a manufacturing cost of the glass, it is preferable that the content of $GeO_2$ is in the range described above.

In the optical glass according to the first embodiment, an upper limit of the content of $La_2O_3$ is preferably 2%. In addition, a lower limit of the content of $La_2O_3$ is preferably 0%. The content of $La_2O_3$ may be 0%.

In a case where the content of $La_2O_3$ increases, the thermal stability and the devitrification resistance of the glass may decrease, and the glass is likely to be devitrified during manufacturing. Therefore, from the viewpoint of suppressing a decrease in the thermal stability and the devitrification resistance, it is preferable that the content of $La_2O_3$ is in the range described above.

In the optical glass according to the first embodiment, an upper limit of the content of $Gd_2O_3$ is preferably 2%. In addition, a lower limit of the content of $Gd_2O_3$ is preferably 0%.

In a case where the content of $Gd_2O_3$ excessively increases, the thermal stability and the devitrification resistance of the glass may decrease, and the glass is likely to be devitrified during manufacturing. In addition, in a case where the content of $Gd_2O_3$ excessively increases, the specific gravity of the glass may increase, which is not preferable. Therefore, from the viewpoint of suppressing an increase in the specific gravity while excellently maintaining the thermal stability and the devitrification resistance of the glass, it is preferable that the content of $Gd_2O_3$ is in the range described above.

In the optical glass according to the first embodiment, an upper limit of the content of $Y_2O_3$ is preferably 2%. In addition, a lower limit of the content of $Y_2O_3$ is preferably 0%. The content of $Y_2O_3$ may be 0%.

In a case where the content of $Y_2O_3$ excessively increases, the thermal stability and the devitrification resistance of the glass may decrease. Therefore, from the viewpoint of suppressing a decrease in the thermal stability and the devitrification resistance, it is preferable that the content of $Y_2O_3$ is in the range described above.

In the optical glass according to the first embodiment, an upper limit of the content of $Yb_2O_3$ is preferably 2%. In addition, a lower limit of the content of $Yb_2O_3$ is preferably 0%.

$Yb_2O_3$ has a molecular weight higher than those of $La_2O_3$, $Gd_2O_3$, and $Y_2O_3$, and thus, may increase the specific gravity of the glass. In a case where the specific gravity of the glass increases, the mass of an optical element increases. For example, in a case where a high-mass lens is built in an autofocus imaging lens, power required to drive the lens when autofocusing increases, and battery consumption increases. Therefore, it is desirable to suppress an increase in the specific gravity of the glass by reducing the content of $Yb_2O_3$.

In addition, in a case where the content of $Yb_2O_3$ is excessively high, the thermal stability and the devitrification resistance of the glass may decrease. From the viewpoint of preventing a decrease in the thermal stability of the glass and of suppressing an increase in the specific gravity, it is preferable that the content of $Yb_2O_3$ is in the range described above.

It is preferable that the optical glass according to the first embodiment mainly contains the glass components described above, that is, $P_2O_5$, $Nb_2O_5$, $TiO_2$, $B_2O_3$, and $Li_2O$ as an essential component, and $BaO$, $SiO_2$, $Al_2O_3$, $WO_3$, $Bi_2O_3$, $Na_2O$, $K_2O$, $Cs_2O$, $MgO$, $CaO$, $SrO$, $ZnO$, $ZrO_2$, $Ta_2O_5$, $Sc_2O_3$, $HfO_2$, $Lu_2O_3$, $GeO_2$, $La_2O_3$, $Gd_2O_3$, $Y_2O_3$, and $Yb_2O_3$ as an arbitrary component, and the total content of the glass components described above is preferably 95% or more, more preferably 98% or more, even more preferably 99% or more, and still even more preferably 99.5% or more.

In the optical glass according to the first embodiment, an upper limit of the content of $TeO_2$ is preferably 2%. In addition, a lower limit of the content of $TeO_2$ is preferably 0%.

Since $TeO_2$ has toxicity, it is preferable to reduce the content of $TeO_2$. Accordingly, it is preferable that the content of $TeO_2$ is in the range described above.

Note that, it is preferable that the optical glass according to the embodiment of the present invention basically contains the glass components described above, and other components can also be contained within a range not impairing the functions and the effects of the present invention. In addition, in the present invention, containing inevitable impurities is not excluded.

<Other Component Compositions>

All of Pb, As, Cd, Tl, Be, and Se have toxicity. Accordingly, it is preferable that the optical glass according to the embodiment of the present invention does not contain such elements as the glass component.

All of U, Th, and Ra are a radioactive element. Accordingly, it is preferable that the optical glass according to the embodiment of the present invention does not contain such elements as the glass component.

V, Cr, Mn, Fe, Co, Ni, Cu, Pr, Nd, Pm, Sm, Eu, Tb, Dy, Ho, Er, and Tm increase the coloration of the glass, and can be a fluorescent light source. Accordingly, it is preferable that the optical glass according to the embodiment of the present invention does not contain such elements as the glass component.

Sb ($Sb_2O_3$) and Ce ($CeO_2$) are an element that functions as a clarificant and can be added arbitrarily. Among them, Sb ($Sb_2O_3$) is a clarificant having a high clarifying effect. Ce ($CeO_2$) has a clarifying effect lower than that of Sb ($Sb_2O_3$). In a case where Ce ($CeO_2$) is added in large amounts, the coloration of the glass tends to be thickened.

Note that, herein, the contents of Sb ($Sb_2O_3$) and Ce ($CeO_2$) are represented by an external ratio, and are not included in the total content of all the glass components represented in terms of an oxide. That is, herein, the total content of all the glass components excluding Sb ($Sb_2O_3$) and Ce ($CeO_2$) is 100% by mass.

The content of $Sb_2O_3$ is represented by an external ratio. That is, the content of $Sb_2O_3$ when the total content of all the glass components other than $Sb_2O_3$ and $CeO_2$ is 100% by mass is preferably 1% by mass or less, and more preferably 0.5% by mass or less, 0.1% by mass or less, 0.08% by mass or less, 0.06% by mass or less, 0.04% by mass or less, and 0.02% by mass or less in this order. The content of $Sb_2O_3$ may be 0% by mass.

The content of $CeO_2$ is also represented by an external ratio. That is, the content of $CeO_2$ when the total content of all the glass components other than $CeO_2$ and $Sb_2O_3$ is 100% by mass is preferably 2% by mass or less, and more preferably 1% by mass or less, 0.5% by mass or less, and 0.1% by mass or less in this order. The content of $CeO_2$ may be 0% by mass. By setting the content of $CeO_2$ to be in the range described above, clarifying properties of the glass can be improved.

<Specific Gravity of Glass>

The optical glass according to the first embodiment is high-refractive index glass and has the specific gravity that is not high. In a case where the specific gravity of the glass can be reduced, the weight of a lens can be reduced. On the other hand, in a case where the specific gravity is excessively low, a decrease in the thermal stability is caused.

Therefore, in the optical glass according to the first embodiment, the specific gravity is preferably 3.40 or less, and more preferably 3.35 or less, 3.30 or less, 3.28 or less, 3.26 or less, and 3.24 or less in this order.

In the optical glass according to the first embodiment, the refractive index nd and the specific gravity d preferably satisfy Expression (1) described below, more preferably satisfy Expression (2) described below, even more preferably satisfy Expression (3) described below, particularly preferably satisfy Expression (4) described below, and most preferably satisfy Expression (5) described below. By the refractive index nd and the specific gravity d satisfying the following expressions, optical glass having a high refractive index and a comparatively reduced specific gravity can be obtained.

$$nd \geq 0.5 \times d + 0.225 \tag{1}$$

$$nd \geq 0.5 \times d + 0.235 \tag{2}$$

$$nd \geq 0.5 \times d + 0.245 \tag{3}$$

$$nd \geq 0.5 \times d + 0.255 \tag{4}$$

$$nd \geq 0.5 \times d + 0.265 \tag{5}$$

(Manufacturing of Optical Glass)

The glass raw materials may be blended to have the predetermined composition described above, and the optical glass according to the embodiment of the present invention may be prepared by the blended glass raw materials in accordance with a known glass manufacturing method. For example, a plurality of types of compounds are blended and sufficiently mixed to be a batch raw material, and the batch raw material is put in a quartz crucible or a platinum crucible and roughly melted. A melted product obtained by the rough melting is rapidly cooled and pulverized to prepare cullet. Further, the cullet is put in a platinum crucible and heated and remelted to be molten glass, and the molten glass is further clarified and homogenized, and then, is molded and gradually cooled to obtain optical glass. A known method may be applied to the molding and the gradual cooling of the molten glass.

Note that, the compound used when blending the batch raw material is not particularly limited insofar as a desired glass component can be introduced into the glass to have a desired content, and examples of such a compound include an oxide, a carbonate, a nitrate, a hydroxide, a fluoride, and the like.

(Manufacturing of Optical Element and Others)

A known method may be applied to the preparation of an optical element by using the optical glass according to the embodiment of the present invention. For example, the glass raw materials are melted to be molten glass, and the molten glass is cast into a mold and molded into the shape of a plate, and a glass material including the optical glass according to the present invention is prepared. The obtained glass material is suitably cut, ground, and polished, and a cut piece having a size and a shape suitable for press molding is prepared. The cut piece is heated and softened, and is press-molded (reheat-pressed) by a known method, and an optical element blank having a shape similar to the shape of the optical element is prepared. The optical element blank is annealed, and is ground and polished by a known method, and an optical element is prepared.

An optical functional surface of the prepared optical element may be coated with an antireflective film, a total reflection film, and the like, in accordance with the intended use.

According to one aspect of the present invention, an optical element including the optical glass described above can be provided. As the type of optical element, a lens such as a planar lens, a spherical lens, and an aspherical lens, a prism, a diffraction grating, a light guide plate, and the like can be exemplified. As the shape of the lens, various shapes such as a biconvex lens, a plano-convex lens, a biconcave lens, a plano-concave lens, a convex meniscus lens, and a concave meniscus lens can be exemplified. As the use of the light guide plate, a display device such as an augmented reality (AR) display type spectacle type device or a mixed reality (MR) display type spectacle type device, and the like can be exemplified. Such a light guide plate is plate-shaped glass that can be attached to the frame of the spectacle type device, and includes the optical glass described above. A diffraction grating for changing a traveling direction of light that is propagated through the light guide plate by repeating total reflection may be formed on the surface of the light guide plate, as necessary. The diffraction grating can be formed by a known method. In a case of wearing a spectacle type device including the light guide plate, the light that is propagated through the light guide plate is incident on the pupils, and thus, the function of augmented reality (AR) display or mixed reality (MR) display is exhibited. Such a spectacle type device, for example, is disclosed in JP Patent Application Laid Open (Translation of PCT Application) 2017-534352 and the like. Note that, the light guide plate can be prepared by a known method. The optical element can be manufactured by a method including a step of processing a glass molded body containing the optical glass. As the processing, severing, cutting, rough grinding, fine grinding, polishing, and the like can be exemplified. By using the glass when performing such processing, a damage can be reduced, and a high-quality optical element can be stably supplied.

Hereinafter, a light guide plate that is one aspect of the present invention, and an image display device using the light guide plate will be described in detail with reference to the drawing. Note that, in the drawings, the same reference numerals are applied to the same or corresponding parts, and the description will not be repeated.

FIG. 2 is a diagram illustrating the configuration of a head mounted display 1 (hereinafter, will be abbreviated to the "HMD 1") using a light guide plate 10 that is one aspect of the present invention, in which FIG. 2(a) is a front perspective view of the HMD 1, and FIG. 2(b) is a rear perspective view of the HMD 1. As illustrated in FIG. 2(a) and FIG. 2(b), a spectacle lens 3 is attached to the front portion of a spectacle type frame 2 to be worn on the head of a user. A backlight 4 for illuminating an image is attached to an attachment portion 2a of the spectacle type frame 2. A signal processing device 5 for projecting an image and a speaker 6 reproducing a sound are provided in a temple portion of the spectacle type frame 2. Flexible printed circuits (FPC) 7 configuring wiring drawn out from a circuit of the signal processing device 5 are wired along the spectacle type frame 2. A display element unit (for example, a liquid crystal display element) 20 is wired by the FPC 7 to the center position of both eyes of the user, and is retained such that approximately the center portion of the display element unit 20 is arranged on an optical axis of the backlight 4. The display element unit 20 is relatively fixed to the light guide plate 10 to be positioned approximately in the center portion of the light guide plate 10. In addition, holographic optical elements (HOE) 32R and 32L (first optical elements) are closely fixed onto a first surface 10a of the light guide plate 10 by adhesion or the like in positions in front of the eyes of the user, respectively. A HOE 52R and a HOE 52L are stacked on a second surface 10b of the light guide plate 10 in a position facing the display element unit 20 through the light guide plate 10.

FIG. 3 is a side view schematically illustrating the configuration of the HMD 1 that is one aspect of the present invention. Note that, in FIG. 3, in order to clarify the drawing, only main parts of the image display device are illustrated, and the spectacle type frame 2 and the like are not illustrated. As illustrated in FIG. 3, the HMD 1 has a structure symmetrical to a center line X connecting the center of an image display element 24 and the center of the light guide plate 10. In addition, light of each wavelength incident on the light guide plate 10 from the image display element 24 is divided into two parts as described below and is guided to each of the right eye and the left eye of the user. The light path of the light of each wavelength to be guided to each of the eyes is also approximately symmetrical to the center line X.

As illustrated in FIG. 3, the backlight 4 includes a laser light source 21, a diffusion optical system 22, and a microlens array 23. The display element unit 20 is an image generating unit including the image display element 24, and for example, is activated by a field sequential method. The laser light source 21 includes laser light sources corresponding to each wavelength of R (a wavelength of 436 nm), G (a wavelength of 546 nm), and B (a wavelength of 633 nm), and sequentially applies light of each wavelength at a high speed. The light of each wavelength is incident on the diffusion optical system 22 and the microlens array 23, is converted into even and highly directional parallel light flux having no unevenness in the amount of light, and is perpendicularly incident on a display panel surface of the image display element 24.

The image display element 24, for example, is a transmissive liquid crystal (LCDT-LCOS) panel that is activated by a field sequential method. The image display element 24 modulates the light of each wavelength, in accordance with an image signal generated by an image engine (not illustrated) of the signal processing device 5. The light of each wavelength that is modulated to pixels in an effective region of the image display element 24 is incident on the light guide plate 10 with the sectional surface of the predetermined light flux (approximately the same shape as that of the effective region). Note that, the image display element 24, for example, can also be replaced with display elements in other forms such as a digital mirror device (DMD), a reflective liquid crystal (LCOS) panel, micro electro mechanical systems (MEMS), an organic electro-luminescence (EL), and an inorganic EL.

Note that, the display element unit 20 is not limited to the display element using the field sequential method, and may be an image generating unit simultaneous display element (a display element including RGB color filters with a predetermined array on the front surface of an exiting surface). In this case, as the light source, for example, a white light source is used.

As illustrated in FIG. 3, the light of each wavelength that is modulated by the image display element 24 is sequentially incident on the inside of the light guide plate 10 from the first surface 10*a*. The HOE 52R and the HOE 52L (second optical elements) are stacked on the second surface 10*b* of the light guide plate 10. The HOE 52R and the HOE 52L, for example, are a reflective volume-phase type HOE in a rectangular shape, and have a configuration in which three photopolymers in which each interference fringe corresponding to the light of each wavelength of R, G, and B is recorded are stacked. That is, the HOE 52R and the HOE 52L are configured to have a wavelength selection function of diffracting the light of each wavelength of R, G, and B and transmitting light of other wavelengths.

Note that, the HOE 32R and the HOE 32L are also a reflective volume-phase type HOE, and have the same layered structure as that of the HOE 52R and the HOE 52L. The HOE 32R and the HOE 32L and the HOE 52R and the HOE 52L, for example, may have approximately the same pitch of an interference fringe pattern.

The centers of the HOE 52R and the HOE 52L are coincident with each other, and the HOE 52R and the HOE 52L are stacked in a state where the interference fringe pattern is reversed by 180 (*deg*). Then, the HOE 52R and the HOE 52L are closely fixed onto the second surface 10*b* of the light guide plate 10 by adhesion or the like such that the centers are coincident with the center line X in the stacked state. The light of each wavelength that is modulated by the image display element 24 is sequentially incident on the HOE 52R and the HOE 52L through the light guide plate 10.

The HOE 52R and the HOE 52L apply a predetermined angle to diffract the light of each wavelength, in order to guide the light of each wavelength that is sequentially incident to each of the right eye and the left eye. The light of each wavelength that is diffracted by the HOE 52R and the HOE 52L repeats the total reflection on the interface between the light guide plate 10 and the air, is propagated through the light guide plate 10, and is incident on each of the HOE 32R and the HOE 32L. Here, the HOE 52R and the HOE 52L apply the same diffraction angle to the light of each wavelength. Accordingly, light of all wavelengths having approximately the same incident position with respect to the light guide plate 10 (or according to another expression, exiting from approximately the same coordinates in the effective region of the image display element 24) is propagated through approximately the same light path inside the light guide plate 10, and is incident on approximately the same position on the HOE 32R and the HOE 32L. According to another viewpoint, the HOE 52R and the HOE 52L diffract the light of each wavelength of RGB such that a pixel position relationship of an image in the effective region that is displayed in the effective region of the image display element 24 is faithfully reproduced on the HOE 32R and the HOE 32L.

As described above, in one aspect of the present invention, each of the HOE 52R and the HOE 52L diffracts the light of all wavelengths exiting from approximately the same coordinates in the effective region of the image display element 24 to be incident on approximately the same position of each of the HOE 32R and the HOE 32L. Alternatively, the HOE 52R and the HOE 52L may be configured to diffract the light of all wavelengths configuring originally the same pixels relatively shifted in the effective region of the image display element 24 to be incident on approximately the same position on the HOE 32R and the HOE 32L.

The light of each wavelength incident on the HOE 32R and the HOE 32L is diffracted by the HOE 32R and the HOE 32L, and sequentially exits from the second surface 10*b* of the light guide plate 10 to the outside approximately perpendicularly. As described above, the light of each wavelength exiting as approximately parallel light forms an image on each of the right eye retina and the left eye retina of the user, as a virtual image I as the image generated by the image display element 24. In addition, the HOE 32R and the HOE 32L may have a condenser function such that the user is capable of observing the virtual image I of an enlarged image. That is, light incident on the peripheral region of the HOE 32R and the HOE 32L may exit at an angle to be close to the center of the pupil, and may form an image on the retina of the user. Alternatively, in order for the user to observe the virtual image I of the enlarged image, the HOE 52R and the HOE 52L may diffract the light of each wavelength of RGB such that the pixel position relationship on the HOE 32R and the HOE 32L is in the enlarged similar shape with respect to the pixel position relationship of the image in the effective region that is displayed in the effective region of the image display element 24.

Since the equivalent optical path length in air of the light traveling through the light guide plate 10 decreases as a refractive index is high, an apparent viewing angle to the width of the image display element 24 can be increased by using the optical glass according to the embodiment of the present invention that has a high refractive index. Further, since the refractive index is high, but the specific gravity is suppressed to be low in the optical glass according to the present invention, a light guide plate that is lightweight and has the effects described above can be provided.

Note that, the light guide plate that is one aspect of the present invention can be used in a see-through type transmissive head mounted display, a non-transmissive head mounted display, or the like.

In such head mounted displays, since the light guide plate includes the optical glass according to the embodiment of the present invention that has a high refractive index and a low specific gravity, the head mounted displays have an excellent sense of immersion according to a wide viewing angle, and are preferable as an image display device that is used by being combined with an information terminal, is used to provide augmented reality (AR) or the like, or is used to provide movie watching, a game, virtual reality (VR), or the like.

The head mounted display has been described as an example, but the light guide plate may be attached to other image display devices.

Second Embodiment

Optical glass according to second embodiment is phosphate optical glass, containing $Nb_2O_5$ and $TiO_2$, in which a refractive index nd and a specific gravity d satisfy Expression (1) described below.

$$nd \geq 0.5 \times d + 0.225 \tag{1}$$

The optical glass according to the second embodiment contains $Nb_2O_5$ and $TiO_2$ as a glass component. By containing $Nb_2O_5$ and $TiO_2$, optical glass having a high refractive index can be obtained.

In the optical glass according to the second embodiment, the refractive index nd and the specific gravity d satisfy Expression (1) described below. In addition, the refractive index nd and the specific gravity d preferably satisfy Expression (2) described below, more preferably satisfy Expression (3) described below, even more preferably satisfy Expression (4) described below, and particularly preferably satisfy Expression (5) described below. By the refractive index nd and the specific gravity d satisfying the following expressions, optical glass having a high refractive index and a comparatively reduced specific gravity can be obtained.

$$nd \geq 0.5 \times d + 0.225 \tag{1}$$

$$nd \geq 0.5 \times d + 0.235 \tag{2}$$

$$nd \geq 0.5 \times d + 0.245 \tag{3}$$

$$nd \geq 0.5 \times d + 0.255 \tag{4}$$

$$nd \geq 0.5 \times d + 0.265 \tag{5}$$

The optical glass according to the second embodiment is phosphate optical glass. The phosphate optical glass indicates optical glass mainly containing a phosphate as a network-forming component of glass. Therefore, the optical glass according to second embodiment contains a phosphate as the network-forming component, and the content thereof is represented by the content of $P_2O_5$. As the network-forming component of the glass, $P_2O_5$, $Al_2O_3$, $B_2O_3$, $SiO_2$, and the like are known. Here, glass mainly containing the phosphate as the network-forming component indicates glass in which the content of $P_2O_5$ is higher than the content of each of $Al_2O_3$, $B_2O_3$, and $SiO_2$ in terms of % by mass.

Non-restrictive examples of the content, the ratio, and the properties of glass components other than the above in the optical glass according to the second embodiment will be described.

In the optical glass according to the second embodiment, a lower limit of the refractive index nd is preferably 1.80, and may be 1.810, 1.820, 1.830, or 1.840. In addition, an upper limit of the refractive index nd is preferably 2.00, and may be 1.950, 1.920, 1.910, 1.900, or 1.8901.

In the optical glass according to the second embodiment, a lower limit of an Abbe's number vd is preferably 17, and may be 18 or 18.5. In addition, an upper limit of the Abbe's number vd is preferably 22, and may be 21 or 20.5.

In the optical glass according to the second embodiment, a lower limit of the content of $P_2O_5$ is preferably 25%, and more preferably 27%, 28%, 29%, 30%, and 31% in this order. In addition, an upper limit of the content of $P_2O_5$ is preferably 40%, and more preferably 39%, 38%, 37%, 36%, and 35% in this order.

$P_2O_5$ is a network-forming component, and is an essential component for containing a large amount of highly dispersive components in the glass. By setting the content of $P_2O_5$ to be in the range described above, thermal stability can be improved.

In the optical glass according to the second embodiment, a lower limit of the content of $Nb_2O_5$ is preferably 15%, and more preferably 20%, 22%, 24%, 25%, 26%, 27%, and 28% in this order. In addition, an upper limit of the content of $Nb_2O_5$ is preferably 40%, and more preferably 39%, 38%, 37%, 36%, and 35% in this order.

$Nb_2O_5$ is a component that contributes to an increase in the refractive index and high dispersion. In addition, by setting the content of $Nb_2O_5$ to be in the range described above, the thermal stability and chemical durability of the glass can be improved. On the other hand, in a case where the content of $Nb_2O_5$ excessively increases, there is a tendency that the thermal stability of the glass decreases, and the coloration of the glass is thickened. In addition, the specific gravity of the glass may increase.

In the optical glass according to the second embodiment, a lower limit of the content of $TiO_2$ is preferably 10%, and more preferably 12%, 14%, 15%, 16%, 17%, and 18% in this order. In addition, an upper limit of the content of $TiO_2$ is preferably 35%, and more preferably 34%, 32%, 31%, 30%, 29%, and 28% in this order.

$TiO_2$ greatly contributes to an increase in the refractive index and high dispersion. In addition, $TiO_2$ contributes to a decrease in the specific gravity among high-refractive index components. By setting the content of $TiO_2$ to be in the range described above, a high refractive index and a low specific gravity can be compatible. On the other hand, in a case where the content of $TiO_2$ is excessively high, there is a tendency that in a process where molten glass is molded and gradually cooled to obtain optical glass, crystal growth in the glass is accelerated, and the transparency of the glass decreases (the glass is clouded). In addition, the coloration may increase.

In the optical glass according to the second embodiment, a lower limit of the content of $B_2O_3$ is preferably 3%, and more preferably 3.00%, 3.50%, 4.00%, and 4.50% in this order. In addition, an upper limit of the content of $B_2O_3$ is preferably 12%, and more preferably 10.0%, 9.0%, 8.0%, and 7.5% in this order.

$B_2O_3$ is a network-forming component of the glass. In addition, $B_2O_3$ contributes to an increase in the refractive index among the network-forming components of the glass. By setting the content of $B_2O_3$ to be in the range described above, the thermal stability of the glass can be improved. On the other hand, in a case where the content of $B_2O_3$ is excessively high, there is a tendency that high dispersion is hindered, and devitrification resistance decreases.

In the optical glass according to the second embodiment, an upper limit of the content of BaO is preferably 15%, and more preferably 5%, 3%, and 1% in this order. In addition, a lower limit of the content of BaO is preferably 0%. The content of BaO may be 0%.

By setting the content of BaO to be in the range described above, the thermal stability and the devitrification resistance of the glass can be improved. On the other hand, in a case where the content of BaO is excessively high, high dispersivity may be impaired, and the thermal stability and the devitrification resistance of the glass may decrease. In addition, the specific gravity of the glass may increase.

In the optical glass according to the second embodiment, an upper limit of the content of $Li_2O$ is preferably 10%, and more preferably 8.00%, 6.00%, 5.00%, and 4.00% in this order. In addition, the content of $Li_2O$ is preferably greater than 0%, and more preferably, a lower limit thereof is 0.02%, 0.30%, 0.40%, 0.50%, and 0.60% in this order.

By setting the content of $Li_2O$ to be in the range described above, the thermal stability of the glass can be improved. In addition, $Li_2O$ contributes to an increase in the refractive index among alkali components. On the other hand, in a case where the content of $Li_2O$ is excessively high, the thermal stability, the chemical durability, and the weather resistance may decrease.

In the optical glass according to the second embodiment, the total content $[Li_2O+Na_2O+K_2O+Cs_2O]$ of $Li_2O$, $Na_2O$, $K_2O$, and $Cs_2O$ is preferably greater than 0%, and more preferably, a lower limit thereof is 0.5%, 2.0%, 3.0%, and 3.5% in this order. In addition, an upper limit of the total content is preferably 15%, and more preferably 14.5%, 14.0%, and 13.7% in this order.

By setting the total content $[Li_2O+Na_2O+K_2O+Cs_2O]$ to be in the range described above, the thermal stability can be improved. On the other hand, in a case where the total content is excessively high, the chemical durability and the weather resistance may decrease. In addition, the refractive index may decrease.

In the optical glass according to the second embodiment, a lower limit of a mass ratio $[TiO_2/(Nb_2O_5+TiO_2+WO_3+Bi_2O_3+Ta_2O_5)]$ of the content of $TiO_2$ to the total content of $Nb_2O_5$, $TiO_2$, $WO_3$, $Bi_2O_3$, and $Ta_2O_5$ is preferably 0.33, and more preferably 0.34, 0.35, 0.36, and 0.37 in this order. In addition, an upper limit of the mass ratio is preferably 0.60, and more preferably 0.58, 0.55, 0.52, 0.51, 0.50, and 0.49 in this order.

All of $Nb_2O_5$, $TiO_2$, $WO_3$, $Bi_2O_3$, and $Ta_2O_5$ are a glass component that contributes to an increase in the refractive index and high dispersion, but also cause an increase in the specific gravity. $TiO_2$ contributes to an increase in the refractive index, compared to $Nb_2O_5$, $WO_3$, $Bi_2O_3$, and $Ta_2O_5$, but is less likely to increase the specific gravity of the glass. Therefore, in the embodiment of the present invention, by setting a content ratio of $TiO_2$ in $Nb_2O_5$, $TiO_2$, $WO_3$, $Bi_2O_3$, and $Ta_2O_5$ to be in the range described above, optical glass having a high refractive index and a low specific gravity can be obtained.

The optical glass according to the second embodiment preferably does not substantially contain fluorine (F). That is, in the optical glass according to the second embodiment, an anionic component is mainly oxygen (O). In a case where the content of F is represented by % by mass with respect to the total amount of glass substances in terms of an oxide, the content of F is preferably less than 1%, and more preferably 0.5% or less, 0.2% or less, and 0.1% or less in this order, by an external ratio.

Here, the "external ratio" of F component indicates the amount of substance of F component that is represented by % by mass when it is assumed that all cationic components configuring the glass form oxides bonded to oxygen commensurate with a charge, and the total amount of substances configuring the glass which are composed of the oxides is set to 100%.

In the optical glass according to the second embodiment, the content and the ratio of glass components other than the above can be identical to those in the first embodiment. In addition, glass properties, the manufacturing of the optical glass, and the manufacturing of an optical element or the like in the second embodiment can also be identical to those in the first embodiment.

EXAMPLES

Hereinafter, the present invention will be described in more detail by Examples. Here, the present invention is not limited to the embodiments described in Examples.

Example 1

Glass samples having glass compositions shown in Table 1 were prepared by the following procedure, and various evaluations were performed.

[Preparation of Optical Glass]

Compound raw materials corresponding to configuration components of the glass, that is, raw materials such as a phosphate, a carbonate, and an oxide were weighed and sufficiently mixed to be a blended raw material. The blended raw material was put in a platinum crucible, was heated and melted at 1000 to 1350° C. in the air atmosphere, and was stirred to be homogenized and clarified, and thus, molten glass was obtained. The molten glass was cast into a mold to be molded, and was gradually cooled, and thus, a block-shaped glass sample was obtained.

[Check of Glass Component Composition]

In the obtained glass sample, the content of each glass component was measured by an inductively coupled plasma atomic emission spectrometry (ICP-AES), and it was checked that the content was as each of the compositions shown in Table 1. Note that, in all of the glass samples, it was checked that fluorine (F) was not contained.

[Measurement of Optical Properties]

In the obtained glass sample, a specific gravity, a refractive index nd, and an Abbe's number vd were measured by the following method. Results are shown in Table 2.

[1] Specific Gravity

The specific gravity was measured by an Archimedes method.

[2] Refractive Index nd and Abbe's Number vd

Refractive indices nd, ng, nF, and nC were measured by a refractive index measurement method of JIS standard JIS B 7071-1, and the Abbe's number vd was calculated on the basis of the following expression.

$$vd=(nd-1)/(nF-nC)$$

TABLE 1

| No. | | | | | | Glass composition (% by mass) | | | | | | | |
|---|---|---|---|---|---|---|---|---|---|---|---|---|---|
| | $SiO_2$ | $P_2O_5$ | $B_2O_3$ | $Li_2O$ | $Na_2O$ | $K_2O$ | MgO | CaO | $TiO_2$ | $Nb_2O_5$ | $WO_3$ | Total | $Sb_2O_3$ |
| 1 | 0.00 | 34.39 | 4.74 | 3.96 | 3.75 | 0.00 | 0.00 | 0.00 | 21.47 | 31.69 | 0.00 | 100.00 | 0.1 |
| 2 | 0.00 | 32.78 | 3.01 | 3.02 | 0.00 | 7.82 | 0.00 | 0.00 | 25.08 | 28.29 | 0.00 | 100.00 | 0.1 |
| 3 | 0.00 | 32.94 | 4.55 | 3.04 | 0.00 | 5.81 | 0.00 | 0.00 | 25.21 | 28.45 | 0.00 | 100.00 | 0.1 |
| 4 | 0.00 | 33.17 | 4.58 | 3.06 | 1.36 | 3.79 | 0.00 | 0.00 | 25.39 | 28.65 | 0.00 | 100.00 | 0.1 |
| 5 | 0.00 | 31.04 | 4.73 | 3.16 | 2.34 | 8.17 | 0.00 | 0.00 | 18.98 | 31.58 | 0.00 | 100.00 | 0.1 |
| 6 | 0.00 | 31.21 | 5.62 | 3.07 | 0.00 | 5.87 | 0.00 | 0.00 | 25.48 | 28.75 | 0.00 | 100.00 | 0.1 |
| 7 | 0.00 | 33.06 | 5.58 | 3.05 | 0.00 | 4.46 | 0.00 | 0.00 | 25.30 | 28.55 | 0.00 | 100.00 | 0.1 |
| 8 | 0.00 | 32.88 | 4.53 | 3.03 | 0.00 | 4.43 | 0.00 | 1.62 | 25.14 | 28.37 | 0.00 | 100.00 | 0.1 |
| 9 | 0.00 | 33.03 | 4.55 | 3.04 | 0.00 | 4.45 | 1.17 | 0.00 | 25.26 | 28.50 | 0.00 | 100.00 | 0.1 |
| 10 | 0.00 | 32.69 | 6.51 | 3.01 | 0.00 | 3.05 | 0.00 | 0.00 | 22.70 | 32.04 | 0.00 | 100.00 | 0.1 |
| 11 | 0.00 | 32.39 | 6.45 | 2.77 | 0.00 | 3.02 | 0.00 | 0.00 | 23.63 | 31.74 | 0.00 | 100.00 | 0.1 |
| 12 | 0.00 | 32.44 | 6.47 | 2.56 | 0.00 | 3.03 | 1.15 | 0.00 | 22.54 | 31.81 | 0.00 | 100.00 | 0.1 |
| 13 | 0.00 | 32.15 | 6.41 | 2.33 | 0.00 | 3.00 | 1.14 | 0.00 | 23.46 | 31.51 | 0.00 | 100.00 | 0.1 |
| 14 | 0.00 | 31.91 | 6.36 | 1.89 | 0.00 | 2.98 | 2.27 | 0.00 | 23.30 | 31.29 | 0.00 | 100.00 | 0.1 |
| 15 | 0.00 | 31.68 | 6.31 | 2.29 | 0.00 | 2.96 | 1.12 | 0.00 | 20.89 | 34.75 | 0.00 | 100.00 | 0.1 |
| 16 | 0.00 | 31.85 | 6.35 | 2.10 | 0.00 | 2.97 | 1.13 | 0.00 | 24.37 | 31.23 | 0.00 | 100.00 | 0.1 |
| 17 | 0.00 | 31.57 | 6.29 | 1.87 | 0.00 | 2.95 | 1.12 | 0.00 | 25.26 | 30.94 | 0.00 | 100.00 | 0.1 |
| 18 | 0.00 | 31.34 | 6.25 | 1.44 | 0.00 | 2.93 | 2.23 | 0.00 | 25.08 | 30.73 | 0.00 | 100.00 | 0.1 |
| 19 | 0.00 | 31.98 | 6.27 | 1.45 | 0.00 | 2.94 | 2.23 | 0.00 | 25.19 | 29.94 | 0.00 | 100.00 | 0.1 |
| 20 | 0.00 | 31.21 | 6.22 | 1.03 | 0.85 | 2.91 | 2.22 | 0.00 | 24.97 | 30.59 | 0.00 | 100.00 | 0.1 |
| 21 | 0.00 | 31.40 | 7.22 | 1.45 | 0.00 | 2.93 | 1.11 | 0.00 | 25.12 | 30.77 | 0.00 | 100.00 | 0.1 |
| 22 | 0.00 | 31.70 | 6.22 | 1.23 | 0.00 | 2.91 | 2.21 | 0.00 | 26.06 | 29.67 | 0.00 | 100.00 | 0.1 |
| 23 | 0.00 | 31.27 | 6.14 | 0.61 | 0.84 | 2.87 | 2.19 | 0.00 | 26.80 | 29.28 | 0.00 | 100.00 | 0.1 |
| 24 | 0.00 | 32.03 | 6.19 | 1.02 | 0.00 | 2.90 | 2.20 | 0.00 | 27.04 | 28.62 | 0.00 | 100.00 | 0.1 |

TABLE 2

| | Glass composition (% by mass) | | Glass properties | | |
|---|---|---|---|---|---|
| No. | $Li_2O + Na_2O + K_2O + Cs_2O$ | $TiO_2/(Nb_2O_5 + TiO_2 + WO_3 + Bi_2O_3 + Ta_2O_5)$ | Specific weight | nd | vd |
| 1 | 7.71 | 0.40 | 3.207 | 1.87350 | 19.92 |
| 2 | 10.84 | 0.47 | 3.198 | 1.87964 | 19.24 |
| 3 | 8.85 | 0.47 | 3.188 | 1.88272 | 19.26 |
| 4 | 8.21 | 0.47 | 3.196 | 1.88713 | 20.18 |
| 5 | 13.67 | 0.38 | 3.185 | 1.84159 | 20.69 |
| 6 | 8.94 | 0.47 | 3.190 | 1.88600 | 19.23 |
| 7 | 7.51 | 0.47 | 3.179 | 1.88443 | 19.29 |
| 8 | 7.46 | 0.47 | 3.210 | 1.88731 | 19.41 |
| 9 | 7.49 | 0.47 | 3.199 | 1.88541 | 19.37 |
| 10 | 6.06 | 0.41 | 3.194 | 1.88397 | 19.23 |
| 11 | 5.79 | 0.43 | 3.195 | 1.89343 | 19.10 |
| 12 | 5.59 | 0.41 | 3.201 | 1.88070 | 19.41 |
| 13 | 5.33 | 0.43 | 3.208 | 1.88627 | 19.18 |
| 14 | 4.87 | 0.43 | 3.215 | 1.88721 | 19.44 |
| 15 | 5.25 | 0.38 | 3.229 | 1.88644 | 19.25 |
| 16 | 5.07 | 0.44 | 3.213 | 1.89302 | 19.08 |
| 17 | 4.82 | 0.45 | 3.221 | 1.89947 | 18.98 |
| 18 | 4.37 | 0.45 | 3.226 | 1.89879 | 19.05 |
| 19 | 4.39 | 0.46 | 3.208 | 1.89349 | 19.17 |
| 20 | 4.79 | 0.45 | 3.226 | 1.89628 | 19.07 |
| 21 | 4.38 | 0.45 | 3.185 | 1.88866 | 18.79 |
| 22 | 4.14 | 0.47 | 3.213 | 1.89933 | 18.97 |
| 23 | 4.32 | 0.48 | 3.219 | 1.90147 | 18.82 |
| 24 | 3.92 | 0.49 | 3.205 | 1.89953 | 18.90 |

Example 2

The optical glasses (Nos. 1 to 24) prepared in Example 1 were compared with the optical glass disclosed in Examples of Patent Document 1. In a graph in which the refractive index nd is a vertical axis, and the specific gravity is a horizontal axis, the optical glasses of Example 1 and the optical glass disclosed in Examples of Patent Document 1 were plotted. Results are illustrated in FIG. 1.

As illustrated in FIG. 1, the optical glass of Example 1 and the optical glass disclosed in Examples of Patent Document 1 can be clearly distinguished by a straight line of nd=0.5× d+0.225. In addition, it was found that the optical glass of Example 1 had a low specific gravity at the same refractive index nd, compared to the optical glass disclosed in Examples of Patent Document 1.

Example 3

A lens blank was prepared by using each of the optical glasses prepared in Example 1 in accordance with a known method, and various lenses were prepared by processing the lens blank in accordance with a known method such as polishing.

The prepared optical lens is various lenses such as a planar lens, a biconvex lens, a biconcave lens, a plano-convex lens, a plano-concave lens, a concave meniscus lens, and a convex meniscus lens.

A secondary chromatic aberration was capable of being excellently corrected by combining various lenses with a lens including another type of optical glass.

In addition, the glass had a low specific gravity, and thus, each of the lenses had a small weight compared to a lens having the same optical properties and size, and was suitable for goggle type or spectacle type AR display device or MR display device. Similarly, a prism was prepared by using various optical glasses prepared in Example 1.

Example 4

Each of the optical glasses prepared in Example 1 was processed into the shape of a rectangular thin plate having Length of 50 mm×Width of 20 mm×Thickness of 1.0 mm to obtain a light guide plate. The light guide plate was built in the head mounted display 1 illustrated in FIG. 2.

In the head mounted display obtained as described above, an image was evaluated in an eye-point position, and a high-brightness and high-contrast image was capable of being observed at a wide viewing angle.

It should be considered that the embodiments disclosed here are exemplary in all respects and not restrictive. The scope of the present invention is shown by the claims but not the above description, and is intended to include all modifications within the meaning and the scope equivalent to the claims.

For example, the optical glass according to one aspect of the present invention can be prepared by performing an adjustment of the composition described herein with respect to the glass composition exemplified above.

In addition, it is obvious that two or more respects described herein as an example or a preferable range can be arbitrarily combined.

The invention claimed is:

1. Optical glass,
wherein a refractive index nd is 1.80 to 2.00,
an Abbe's number vd is 17 to 22,
a content of $P_2O_5$ is 25 to 40% by mass,
a content of $Nb_2O_5$ is 15 to 40% by mass,
a content of $TiO_2$ is 10 to 35% by mass,
a content of $B_2O_3$ is 3 to 12% by mass,
a content of BaO is 0 to 5% by mass,
a content of $Li_2O$ is greater than 0% by mass and 10% by mass or less,
a total content $[Li_2O+Na_2O+K_2O+Cs_2O]$ of $Li_2O$, $Na_2O$, $K_2O$, and $Cs_2O$ is greater than 0% by mass and 15% by mass or less,
a mass ratio $[TiO_2/(Nb_2O_5+TiO_2+WO_3+Bi_2O_3+Ta_2O_5)]$ of the content of $TiO_2$ to a total content of $Nb_2O_5$, $TiO_2$, $WO_3$, $Bi_2O_3$, and $Ta_2O_5$ is 0.37 to 0.60, and
F is not substantially contained.

2. An optical element blank, comprising the optical glass according to claim 1.

3. An optical element, comprising the optical glass according to claim 1.

4. A light guide plate, comprising the optical glass according to claim 1.

5. An image display device, comprising:
an image display element; and
a light guide plate guiding light exiting from the image display element,
wherein the light guide plate comprises the optical glass according to claim 1.

6. Optical glass according to claim 1,
wherein a content of $SiO_2$ is 3% by mass or less,
a content of $Al_2O_3$ is 3% by mass or less,
a total content $[P_2O_5+B_2O_3+SiO_2+Al_2O_3]$ of $P_2O_5$, $B_2O_3$, $SiO_2$, and $Al_2O_3$ is 28 to 45% by mass,
a content of $WO_3$ is 5% by mass or less,
a content of $Bi_2O_3$ is 5% by mass or less,
a total content $[TiO_2+Nb_2O_5+WO_3+Bi_2O_3]$ of $TiO_2$, $Nb_2O_5$, $WO_3$, and $Bi_2O_3$ is 40 to 65% by mass,
a mass ratio $[(P_2O_5+B_2O_3+SiO_2+Al_2O_3)/(TiO_2+Nb_2O_5+WO_3+Bi_2O_3)]$ of the total content of $P_2O_5$, $B_2O_3$, $SiO_2$, and $Al_2O_3$ to the total content of $TiO_2$, $Nb_2O_5$, $WO_3$, and $Bi_2O_3$ is 0.50 to 0.85,
a content of $Na_2O$ is 5.0% by mass or less,
a content of $K_2O$ is 12% by mass or less,
a content of $Cs_2O$ is 2% by mass or less,
a content of MgO is 10% by mass or less,
a content of CaO is 5% by mass or less,
a content of SrO is 5% by mass or less,
a total content [MgO+CaO+SrO+BaO] of MgO, CaO, SrO, and BaO is 10% by mass or less,
a content of ZnO is 5% by mass or less,
a content of $ZrO_2$ is 5% by mass or less,
a content of $Ta_2O_5$ is 5% by mass or less,
a content of $Sc_2O_3$ is 2% by mass or less,
a content of $HfO_2$ is 2% by mass or less, a content of $Lu_2O_3$ is 2% by mass or less,
a content of $GeO_2$ is 2% by mass or less,
a content of $La_2O_3$ is 2% by mass or less,
a content of $Gd_2O_3$ is 2% by mass or less,
a content of $Y_2O_3$ is 2% by mass or less,
a content of $Yb_2O_3$ is 2% by mass or less,
a total content of $P_2O_5$, $Nb_2O_5$, $TiO_2$, $B_2O_3$, $Li_2O$, BaO, $SiO_2$, $Al_2O_3$, $WO_3$, $Bi_2O_3$, $Na_2O$, $K_2O$, $Cs_2O$, MgO, CaO, SrO, ZnO, $ZrO_2$, $Ta_2O_5$, $Sc_2O_3$, $HfO_2$, $Lu_2O_3$, $GeO_2$, $La_2O_3$, $Gd_2O_3$, $Y_2O_3$, and $Yb_2O_3$ is 95% by mass or more, and a content of $TeO_2$ is 2% by mass or less.

7. Phosphate optical glass containing $Nb_2O_5$ and $TiO_2$,
wherein a mass ratio $[(P_2O_5+B_2O_3+SiO_2+Al_2O_3)/(TiO_2+Nb_2O_5+WO_3+Bi_2O_3)]$ of the total content of $P_2O_5$, $B_2O_3$, $SiO_2$, and $Al_2O_3$ to the total content of $TiO_2$, $Nb_2O_5$, $WO_3$, and $Bi_2O_3$ is 0.50 to 0.85,
an Abbe's number vd is 17 or more, and
a refractive index nd and a specific gravity d satisfy Expression (1) described below:

$$nd \geq 0.5 \times d + 0.225 \tag{1}.$$

8. An optical element blank, comprising the optical glass according to claim 7.

9. An optical element, comprising the optical glass according to claim 7.

10. A light guide plate, comprising the optical glass according to claim 7.

11. An image display device, comprising:
an image display element; and
a light guide plate guiding light exiting from the image display element,
wherein the light guide plate comprises the optical glass according to claim 7.

12. Phosphate optical glass according to claim 7, wherein a content of $P_2O_5$ is 25 to 40% by mass.

13. Phosphate optical glass according to claim 7, wherein a content of $Nb_2O_5$ is 15 to 40% by mass.

14. Phosphate optical glass according to claim 7, wherein a content of $TiO_2$ is 10 to 35% by mass.

15. Phosphate optical glass according to claim 7, wherein a content of $B_2O_3$ is 3 to 12% by mass.

16. Phosphate optical glass according to claim 7, wherein a content of BaO is 0 to 15% by mass, and a content of $Li_2O$ is greater than 0% by mass and 10% by mass or less.

17. Phosphate optical glass according to claim 7, wherein a total content $[Li_2O+Na_2O+K_2O+Cs_2O]$ of $Li_2O$, $Na_2O$, $K_2O$, and $Cs_2O$ is greater than 0% by mass and 15% by mass or less.

18. Phosphate optical glass according to claim 7, wherein a mass ratio $[TiO_2/(Nb_2O_5+TiO_2+WO_3+Bi_2O_3+Ta_2O_5)]$ of the content of $TiO_2$ to a total content of $Nb_2O_5$, $TiO_2$, $WO_3$, $Bi_2O_3$, and $Ta_2O_5$ is 0.33 to 0.60.

19. Phosphate optical glass according to claim 7, wherein F is not substantially contained.

20. Phosphate optical glass according to claim 7,
wherein a content of $SiO_2$ is 3% by mass or less,
a content of $Al_2O_3$ is 3% by mass or less,
a total content $[P_2O_5+B_2O_3+SiO_2+Al_2O_3]$ of $P_2O_5$, $B_2O_3$, $SiO_2$, and $Al_2O_3$ is 28 to 45% by mass,
a content of $WO_3$ is 5% by mass or less,
a content of $Bi_2O_3$ is 5% by mass or less,
a total content $[TiO_2+Nb_2O_5+WO_3+Bi_2O_3]$ of $TiO_2$, $Nb_2O_5$, $WO_3$, and $Bi_2O_3$ is 40 to 65% by mass,
a content of $Na_2O$ is 5.0% by mass or less,
a content of $K_2O$ is 12% by mass or less,
a content of $Cs_2O$ is 2% by mass or less, a content of MgO is 10% by mass or less,
a content of CaO is 5% by mass or less,
a content of SrO is 5% by mass or less,
a total content [MgO+CaO+SrO+BaO] of MgO, CaO, SrO, and BaO is 10% by mass or less,
a content of ZnO is 5% by mass or less,
a content of $ZrO_2$ is 5% by mass or less,
a content of $Ta_2O_5$ is 5% by mass or less,
a content of $Sc_2O_3$ is 2% by mass or less,
a content of $HfO_2$ is 2% by mass or less,
a content of $Lu_2O_3$ is 2% by mass or less,
a content of $GeO_2$ is 2% by mass or less,
a content of $La_2O_3$ is 2% by mass or less,
a content of $Gd_2O_3$ is 2% by mass or less,
a content of $Y_2O_3$ is 2% by mass or less,
a content of $Yb_2O_3$ is 2% by mass or less,
a total content of $P_2O_5$, $Nb_2O_5$, $TiO_2$, $B_2O_3$, $Li_2O$, BaO, $SiO_2$, $Al_2O_3$, $WO_3$, $Bi_2O_3$, $Na_2O$, $K_2O$, $Cs_2O$, MgO, CaO, SrO, ZnO, $ZrO_2$, $Ta_2O_5$, $Sc_2O_3$, $HfO_2$, $Lu_2O_3$, $GeO_2$, $La_2O_3$, $Gd_2O_3$, $Y_2O_3$, and $Yb_2O_3$ is 95% by mass or more, and a content of $TeO_2$ is 2% by mass or less.

* * * * *